Aug. 13, 1940.   A. L. STONE   2,211,179
CASING JOINT
Filed Nov. 12, 1938   3 Sheets-Sheet 1
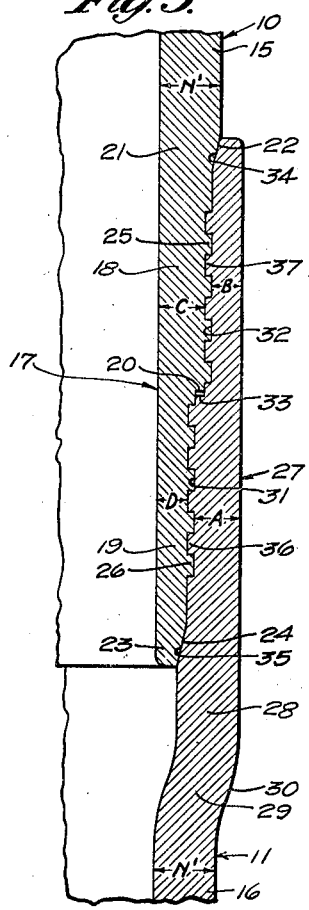
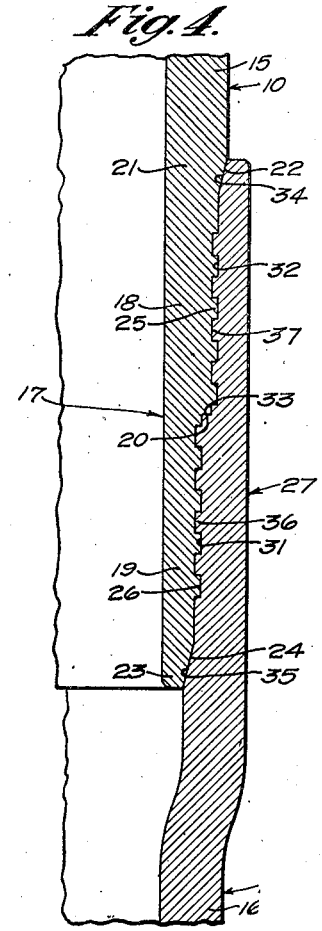
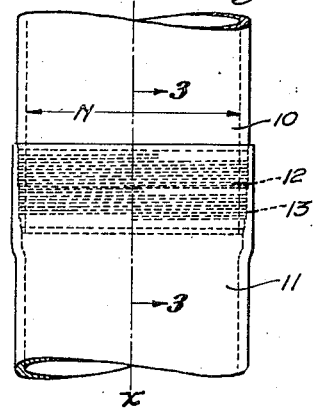
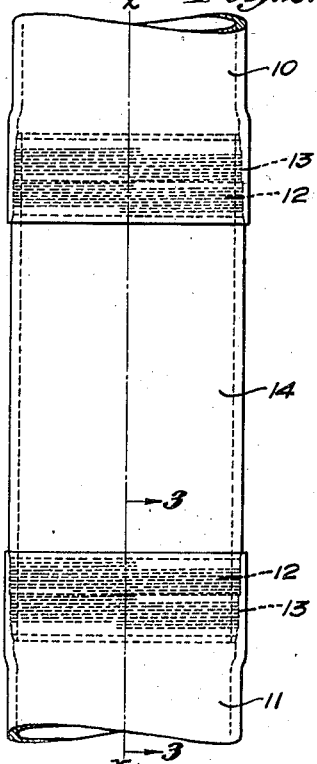
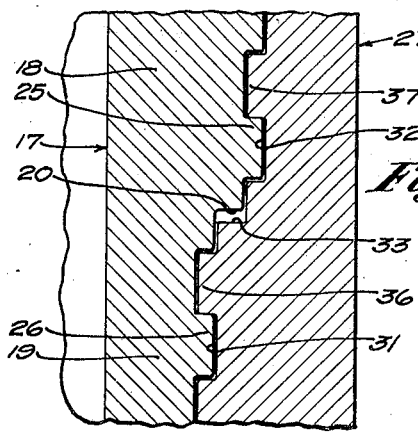
Inventor
Albert L. Stone.
Attorney.

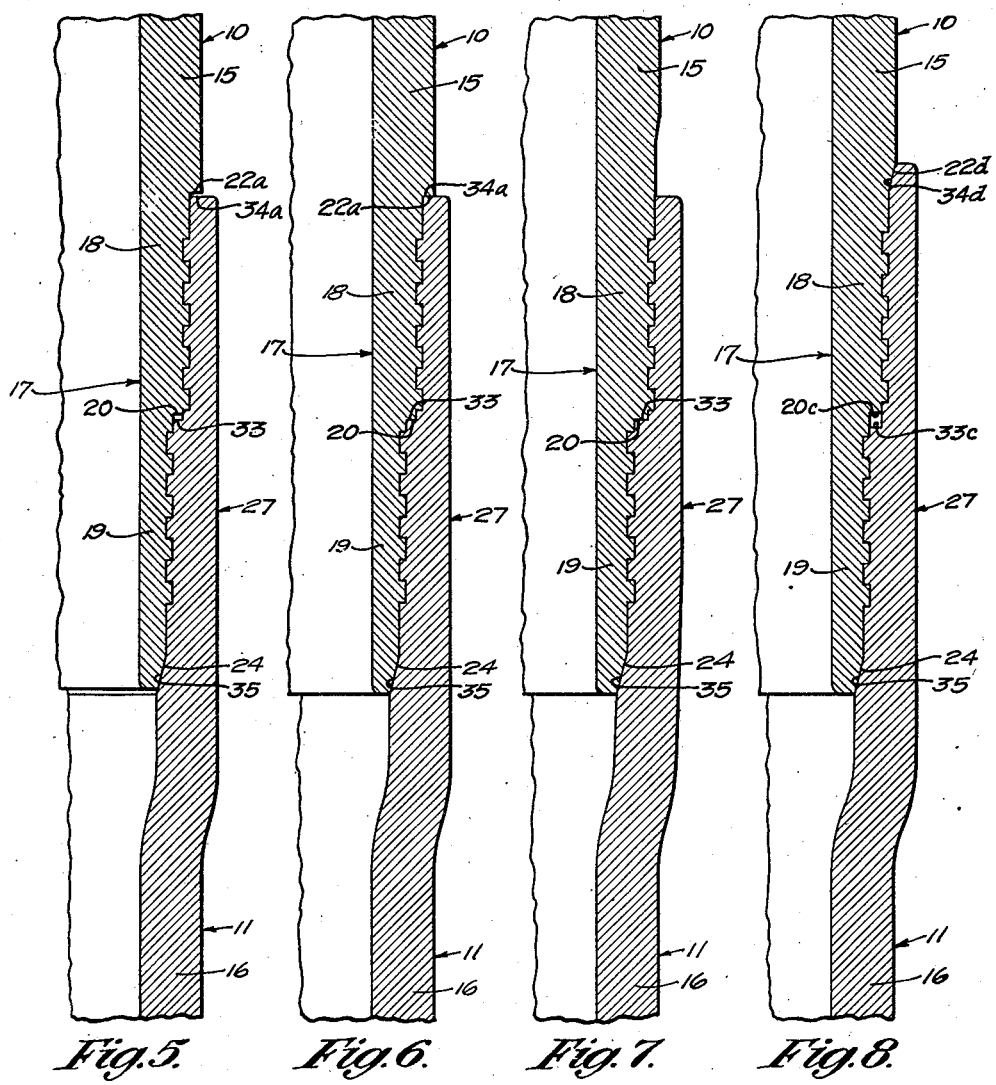

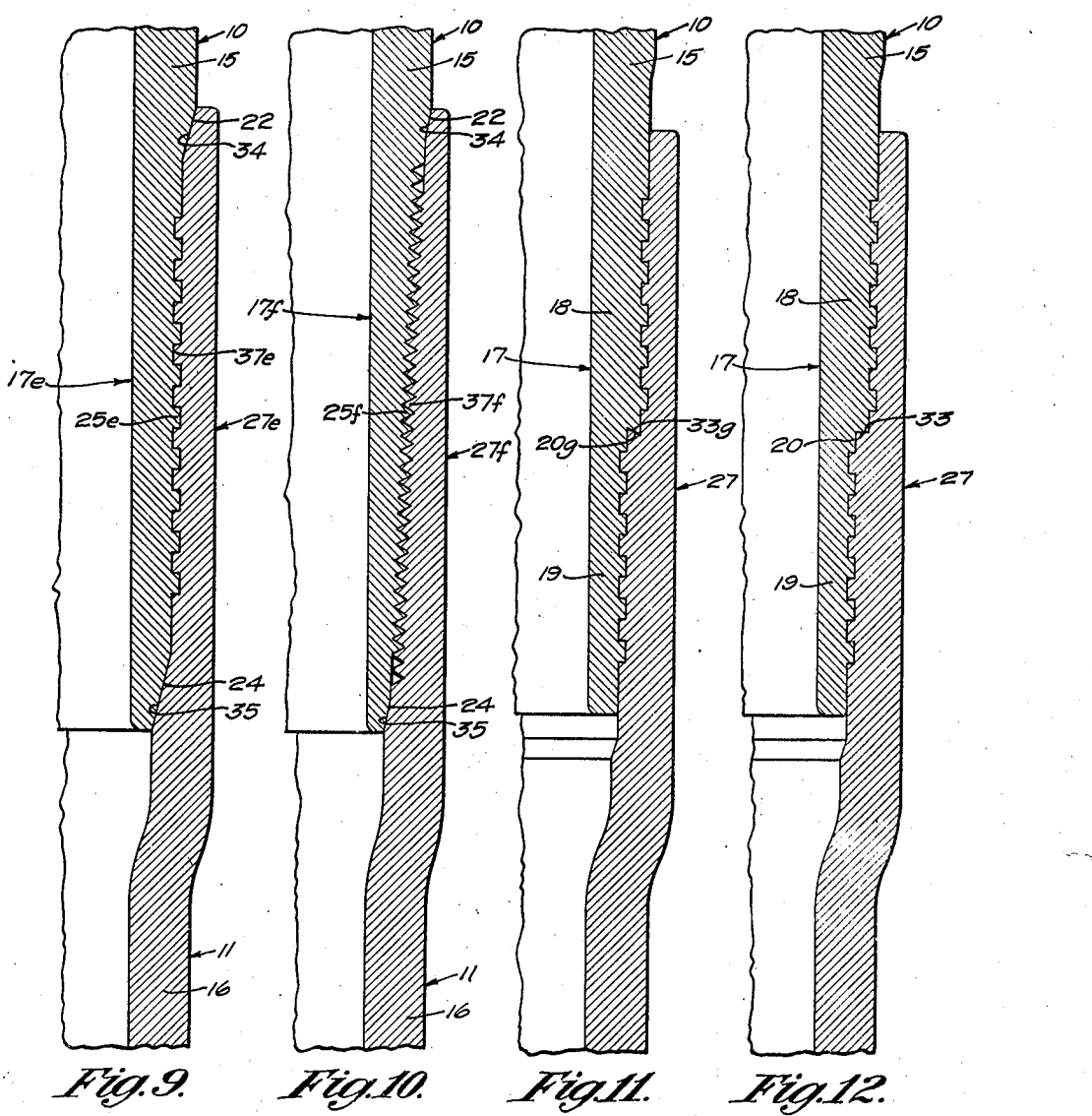

Patented Aug. 13, 1940

2,211,179

UNITED STATES PATENT OFFICE 2,211,179

CASING JOINT

Albert L. Stone, Palos Verdes Estates, Calif., assignor to Hydril Company of California, Los Angeles, Calif., a corporation of California Application November 12, 1938, Serial No. 240,026

3 Claims. (Cl. 285—146)

This invention has to do generally with threaded pipe joints and is more particularly concerned with joints especially well adapted for coupling sections of casing used in lining well bores, though not limited to such adaptation.

The general objects of the invention are to provide highly efficient joints which may be made up with ease and dispatch, will mate in fluid-tight relationship in a manner to resist leakage either from within or without the pipe, will effectively resist both bursting and collapsing strains, and will effectively withstand the torsional and tensile strains to which they are exposed. The joints are particularly high in tensile efficiency, that is, in the relation of their strength to the strength of the body of the pipe when jointed lengths of pipe are put in tension.

In casing it is essential that substantially the full inside diameter of the pipe be preserved through the joints so drilling tools or other apparatus may be lowered and operated through them without interference from inwardly protruding shoulders. This eliminates the opportunity of appreciably internally upsetting the box of the joint or the use of thick-walled separable boxes. Likewise, it is highly desirable to keep the outer periphery of the joint as nearly as possible flush with the outer periphery of the body of the casing, in order to make it more easily possible to lower the casing through packing heads and the like at the top of the well bore.

It is desirable that the weight and wall-thickness of casing be kept to a minimum both for economic reasons and for maintaining as large a work-bore as possible, and since one or more internal seating shoulders are to be provided (in some instances external seating shoulders are also to be provided) it will be seen that a serious problem is presented in working these various features into stock having, to begin with, comparatively little radial extent.

In U. S. Patent No. 2,006,520, issued to Frederick Stone and myself, jointly, on July 2, 1935, for Casing joint, there is set forth a casing joint having the above characteristics. With the exception of the fact that there are presented slightly protruding external shoulders at the joint, the present invention permits the securement of an internally flush joint which has all the advantages of the joint set forth in said patent plus a decidedly higher tensile efficiency (as defined above). In spite of this increase in efficiency, the nature of the joint is such that upsetting and certain blank-cutting operations (which would be expected to be necessary to accomplish such a result) are avoided, with an obvious saving in cost of manufacture.

The shoulders presented externally (in contradistinction to the external flush characteristics of the joint disclosed in said patent) are of such relatively little radial extent that they do not prevent the use of the joint in most situations, though the completely flush joint has a field where the substitution of the present joint would not be advisable. In any event, the radial extent of the externally exposed joint shoulders of the present invention is far less than that of the collars on standard A. P. I. casing.

How the above is accomplished, as well as other objects and features of the invention, will be best understood from consideration of the following detailed description, reference being had to the accompanying drawings, in which:

Fig. 1 is an elevation of an embodiment of my invention where one end of a casing length is directly coupled to the end of an adjacent length, it being understood that ordinarily, though not necessarily, each length of casing has an internally threaded box at one end and an externally threaded pin at the other;

Fig. 2 is an embodiment of the invention wherein a double-ended pin coupling is interposed between two lengths of casing;

Fig. 3 is an enlarged fragmentary section on line 3—3 of Fig. 1 or Fig. 2, but showing the parts before the joint is fully made up;

Fig. 3a is an enlarged fragmentary detail of the thread construction shown in Fig. 3, at about the center of the joint;

Fig. 4 is a view similar to Fig. 3 but showing the joint fully made up;

Fig. 5 is a view along the lines of Fig. 3 but showing a variation in the form of one set of seating shoulders, the parts being shown in the positions they occupy before the joint is fully made up;

Fig. 6 is a view similar to Fig. 5 but showing the joint fully made up; and

Figs. 7 to 12, inclusive, are views along the lines of Fig. 3, but individually showing variations in the forms of seating shoulders, all views showing the positions of the parts when the individual joints are fully made up.

In Figs. 1 and 2 the casing lengths to be coupled are indicated at 10 and 11. In Fig. 1 these lengths are directly coupled, a pin portion 12, integral with casing 10, interfitting with box 13 formed integrally with casing 11. In Fig. 2 opposed boxes 13 are formed integrally with casings 10 and 11, while duplicate pin portions 12 are integral with opposite ends of tubular coupling member 14. The sectional views may therefore be considered as taken on line 3—3 of either Figs. 1 or 2, the utilization of the double-ended coupling or of the direct connection between casing lengths being merely a matter of choice. Because the coupling body has the same diametrical characteristics as the body portion of the pipe or casing, proper, said coupling may be considered as a pipe in the terminology of the claims.

In Figs. 1 to 8, inclusive, 11 and 12, I have shown the threaded joint between coupled members as being of the two-step type, the threads being approximately square and the steps being substantially cylindrical. Many of the features of this type of joint are set forth in the aforementioned patent, and the remarks there made in this connection, may be applied with equal force to the instant showing. So also may be the remarks directed to the nature of the thread-seating distribution of strains, relative cross-sectional areas, etc., wherever they are common to the two showings. In this connection, I have occasion to give certain approximate dimensions and angles, and, in the drawings, the clearances are shown of exaggerated extent, but it will be understood this is done merely for illustrative purposes and is not to be considered as limitative. So, also it will be understood that while the invention may be embodied with particular advantage in a two-step joint of the character shown in said patent, it is also applicable with advantage to other types of threaded joints, some of which will be described at a later point in the specification.

The body portions 15 and 16 of casing lengths 10 and 11, respectively, have equal inside and equal outside diameters, it following that the "normal" wall thickness N' of both lengths are the same. The pin portion or member 17 of casing 10, which portion may be considered the spigot end of the joint, has the same inside diameter N (Fig. 1) as has the body portion 15, but is externally cut down to form the relatively large and small steps 18 and 19, respectively, with a square-cut, annular shoulder 20 between steps. At the base end 21 of the pin, there is provided an annular, tapered shoulder 22 which inclines inwardly and downwardly toward the joint axis X—X (Fig. 1). While the degree of taper may vary in accordance with different demands to be placed thereon, it is found that about 14° is, on the average, a proper angle of cut.

On the free end 23 of pin portion 17, is provided annular tapered shoulder 24 which inclines in the same direction and is of approximately the same angle of taper as shoulder 22, though this agreement in degree or angle of taper is not essential in all cases. Due to the thinning down and tapering of end 23, this end serves as a more or less radially resilient sealing lip or nose, as will appear. The wall thickness of the pin at the large-diameter portion of the tapered shoulder is approximately one half the thickness of the wall of the body portion of the pipe.

Substantially square threads 25 and 26 are cut on steps 18 and 19, respectively, these threads being of the same pitch and outline characteristics, being carefully cut so one thread is, in effect, a continuation of the other so far as lead is concerned. It will be noted that the minimum wall thickness of the threaded portion of the smaller pin step is about one half the thickness of the wall of the body portion of the pipe.

Box portion or member 27 is formed by belling or radially spreading the outer end of casing 11, it resulting that the thickness of the wall of the box portion at point 28 adjacent the smooth, reverse curve 29, is not necessarily greater than thickness N', preferably being approximately the same as that thickness N'. Beyond this point, the wall of the box will normally be slightly thinner than N', though not to an appreciable extent. Reversely curved portion 29 may be considered as an annular, diametrically offsetting portion between the body of the pipe and the box, proper. A smooth, curved surface 30 is presented to the exterior of the pipe which eases its passage through packing heads or the like (not shown) as will be readily understood. Box portion 27 is internally cut to provide bore 31 and counterbore 32, complementary to pin steps 19 and 18, respectively, and, between the bore and counterbore is provided an annular square-cut shoulder 33 which is complementary to and adapted to oppose pin shoulder 20. At the outer end of the box is provided a shoulder 34 which is complementary to pin shoulder 22, while at the inner end of the box is a shoulder 35 which is complementary to pin shoulder 24.

Bores 31 and 32 are provided with threads 36 and 37, respectively, which are complementary to pin threads 26 and 25, respectively. The box and pin threads are preferably cut to have the mating characteristics clearly shown in Fig. 3a and fully described in the aforementioned patent, with all the attendant advantages. The same is true of all the later-described embodiments wherein square threads are employed. The belling of the box end to an extent which brings its outer periphery radially beyond the outer periphery of the adjacent casing length 10 makes it possible to increase the thickness of the longitudinally overlapping or telescoping parts of the pin and box beyond the thickness of the corresponding parts of the joint disclosed in the aforementioned patent.

Accordingly, not only are the tension loads distributed in the manner and to the advantageous ends set forth in said patent, but with this increase in thickness of the threaded parts with relation to the thickness of the body portion of the pipe, the joint "efficiency" (ratio of joint strength to body strength when in tension) is appreciably increased over that of the disclosure of said patent. And it will be noted that this increase is accomplished without appreciable radial projection of the box portion beyond the outer periphery of casing 10 and without the necessity of expensive "upsetting" and extensive boring operations. It will also be noted that the thinnest portion of the pin (step 19) is relatively thicker than the corresponding part of the joint disclosed in said patent, and is thus better adapted to withstand the wear due to operation of a drill string within the casing. It will also be noted that the wall thicknesses of the box and pin portions adjacent shoulders 20—33 are each substantially equal to one half the thickness of the wall of the body portion of either pipe.

In making up the joint, the pin portion is dropped into the box or "stabbed" until the pin steps engage the complementary box steps, whereupon the pin is rotated to screw the parts together until shoulder 24 engages shoulder 35 or shoulder 22 engages shoulder 34. Or, if desired, the shoulders may be spaced so engagement of the two sets occurs practically simultaneously. The initial sealing engagement of the first set of shoulders or the simultaneous engagement of both sets, if they are spaced to bring that situation about, occurs when the joint is subjected to what I will term "normal torque strain," meaning by this a strain which does not tend appreciably to displace the metal of the box or pin.

The several sets of shoulders are so spaced that when both pairs 24—35 and 22—34 are engaged, the intermediate, square-cut shoulders 20—33 are spaced apart. In a casing of about 11¾" O. D., this spacing may properly be of the order of .024". Then the joint parts are further threaded together until shoulders 20—33 tightly engage one another, as in Fig. 4. This requires the subjection of the joint to strain additional to the "normal torque strain" required initially to seat shoulders 24—35 and 22—34, and this additional torque strain is necessarily of a magnitude slightly to displace the metal of the joint parts. Some of this displacement occurs by an inward pressing of lip 23, but this only serves to make a tighter seal between shoulders 24—35 and therefore against the leakage of internal fluid under pressure. Also, some of the displacement occurs by way of radial distension of the free end of the box, but this only serves to make a tighter seal between shoulders 22—34 and therefore against the leakage into the pipe of external fluid under pressure. The tendency to leak in one direction or the other depends, of course, upon the particular ratio between internal and external pressures encountered in a given situation. Whichever pressure is effective in a given instance, that pressure is also effective to engage the relatively thin, exposed free end of the box or pin (whichever may be exposed to the predominant pressure) more tightly with the opposing shoulder.

Shoulders 20—33 are located so they will always engage or act as a positive stop or limit before the wedging action of the tapered end shoulders expands the box or contracts nose 23 beyond their elastic limits. Casing is sometimes rotated against a load, tending to make the joints up tighter. Part of this torque load is taken up by shoulders 22—34 and 24—35 but the major portion is taken by shoulders 20—33 which prevents the driving or rotating load from overly distorting the free end of the box or pin, just as it is during the normal making-up of the joint.

In Figs. 5 and 6 I have shown a variation wherein all parts are the same as in Fig. 3 except as to the outer box shoulder. Corresponding parts in this view, as well as in all other variational views to be later described, are given the same reference numerals and perform the same functions as in Fig. 3. In Figs. 5 and 6, shoulders 22a and 34a are square-cut or substantially perpendicular to the axis of the joint and they are so located with respect to the other annular shoulders that they engage after shoulders 24—35 have engaged but before shoulders 20—33 have engaged. Shoulders 22a and 34a act as initial stops which limit the makeup movement of the joint-parts under ordinary circumstances and thus normally take most of the torque strains, but under unusually heavy torque strains the metal adjacent these shoulders will yield or become slightly displaced until the final or positive-stop shoulders 20—33 come into play (see Fig. 6), said shoulders 20—23 acting as limit stops before the metal has been displaced beyond its elastic limit.

In Fig. 7 I have shown a variation wherein all parts are the same as in Fig. 3 except as to the outer box shoulders. Here there is no shoulder engagement between the base of the pin portion and the outer end of the box. In this case, any external fluid which may leak in between pin step 18 and the outer end of the box, is sealed off from the interior of the pipe by the engaged shoulders 20—33. The box wall which surrounds pin step 18 reinforces that step against collapse deformation under relatively high pressure which may leak in between that step and the box, for the box tends to hold the pin in round, it being noted that the fluid pressure is equalized at opposite sides of this portion of the box wall so there is no tendency for this external pressure to deform the box itself.

In Fig. 8, the showing is the same as in Fig. 3 except that here shoulders 20c—33c are so located that they will not contact under any normal conditions of torque load, shoulders 24—35 and 22d—34d taking all the torque load when the joint is completely made-up. In this case, tapered shoulders 22d—34d are not quite as long as sholders 24—35, and these two sets of shoulders may seat either in the order named or substantially simultaneously.

In Fig. 9 the pin 17e and box 27e are unstepped and have straight, cylindrical threads 25e and 37e, respectively. There being no steps and no intermediate shoulders provided, the stock left for the pin wall and box wall may be of uniform thickness throughout its length. Shoulders 24—35 and 22—34 may seat either in the order named or substantially simultaneously.

In Fig. 10 the single straight threads of Fig. 9 are replaced by taper V threads 25f and 37f. In this case the joint makes up first by the "draw" of its taper threads and then shoulders 24—35 and 22—34 seat either in the order named or substantially simultaneously.

In Figs. 11 and 12 the annular seating shoulders at both ends of the box and pin are omitted, the single seal occurring at the engaged shoulders located between the steps of the joint. In Fig. 12 these engaged shoulders 20—33 are square-cut or perpendicular to the joint axis, while in Fig. 11 the corresponding shoulders 20g—33g are inclined so as to form mutual overhangs which tend to prevent radial separation between box and pin at their mid points. In both forms, the shoulders engage to provide a seal against leakage due to either internal or external fluid pressure.

The described displacement of metal after certain shoulders of individual pairs have engaged one another and the joint is then made up still tighter, is so slight that it is not feasible to indicate it on the drawings, but the nature of such displacement will be readily understood by those skilled in the art.

While I have shown and described preferred embodiments of my invention, it will be understood that various changes in design, structure and arrangement may be made without departing from the spirit and scope of the appended claims.

I claim:

1. A threaded joint for connecting a pair of pipes whose body portions have substantially equal inside diameters, one end of one pipe being belled to receive the spigot end, which is integral with the other pipe, in telescopic relation, the inside diameter of the spigot end being substantially the same as that of the body portion of its pipe, the telescoping ends being provided with two mating zones of threads and positive-stop seating shoulders between zones, the outer wall of the belled end projecting diametrically beyond the outer peripheral face of the other pipe, mating, tapered sealing surfaces on the wall of the bell and the free extremity of the spigot end, and other mating sealing surfaces between the spigot end and the wall of the bell, the wall thickness of said one pipe being substantially uniform from the point at which said free end of the spigot lies when the joint is made up to at least a point beyond the bell, and the wall thickness of the body portion of the other pipe being substantially uniform and substantially equal to the wall thickness of said one pipe between the points specified; the telescoping ends being so proportioned and the shoulders and surfaces being so spaced that when the joint is made up with predetermined torque strain said sealing surfaces are engaged in fluid tight relation and so said seating shoulders subsequently engage when the joint is subjected to additional torque strain of a magnitude slightly to displace the metal of the joint parts.

2. A threaded joint for connecting a pair of pipes whose body portions have substantially equal inside diameters, one end of one pipe being belled to receive the spigot end, which is integral with the other pipe, in telescopic relation, the inside diameter of the spigot end being substantially the same as that of the body portion of its pipe, the telescoping ends being provided with two mating zones of threads and positive-stop seating shoulders between zones, the outer wall of the belled end projecting diametrically beyond the outer peripheral face of the other pipe, mating, tapered sealing surfaces on the wall of the bell and the free extremity of the spigot end, and other mating, tapered sealing surfaces between the spigot end and the wall of the bell, the wall thickness of said one pipe being substantially uniform from the point at which said free end of the spigot lies when the joint is made up to at least a point beyond the bell, and the wall thickness of the body portion of the other pipe being substantially uniform and substantially equal to the wall thickness of said one pipe between the points specified; the telescoping ends being so proportioned and the shoulders and surfaces being so spaced that when the joint is made up with predetermined torque strain said sealing surfaces are engaged in fluid tight relation and so said seating shoulders subsequently engage when the joint is subjected to additional torque strain of a magnitude slightly to displace the metal of the joint parts.

3. A threaded joint for connecting a pair of pipes whose body portions have substantially equal inside diameters, one end of one pipe being belled to receive the spigot end, which is integral with the other pipe, in telescopic relation, the inside diameter of the spigot end being substantially the same as that of the body portion of its pipe, the telescoping ends being provided with two mating zones of threads and positive-stop seating shoulders between zones, the outer wall of the belled end projecting diametrically beyond the outer peripheral face of the other pipe, mating, tapered sealing surfaces on the wall of the bell and the free extremity of the spigot end, and other mating, tapered sealing surfaces between the spigot end and the wall of the bell with the tapered surface on the spigot end tapering directly from the outer peripheral face of the body portion of said other pipe inwardly and toward the free extremity of the spigot end, the wall thickness of said one pipe being substantially uniform from the point at which said free end of the spigot lies when the joint is made up to at least a point beyond the bell, and the wall thickness of the body portion of the other pipe being substantially uniform and substantially equal to the wall thickness of said one pipe between the points specified; the telescoping ends being so proportioned and the shoulders and surfaces being so spaced that when the joint is made up with predetermined torque strain said sealing surfaces are engaged in fluid tight relation and so said seating shoulders subsequently engage when the joint is subjected to additional torque strain of a magnitude slightly to displace the metal of the joint parts.

ALBERT L. STONE.